(12) United States Patent
Brouwer et al.

(10) Patent No.: US 12,329,073 B2
(45) Date of Patent: Jun. 17, 2025

(54) SOD HARVESTING SYSTEMS WITH SLAB LENGTH ADJUSTABILITY

(71) Applicant: 1045929 Ontario Limited, Keswick (CA)

(72) Inventors: Gerardus J. Brouwer, Keswick (CA); Ian L. Morgan, Cambridge (CA)

(73) Assignee: 1045929 Ontario Limited, Keswick (CA)

( * ) Notice: Subject to any disclaimer, the term of this patent is extended or adjusted under 35 U.S.C. 154(b) by 741 days.

(21) Appl. No.: 17/551,254

(22) Filed: Dec. 15, 2021

(65) Prior Publication Data
US 2022/0104433 A1  Apr. 7, 2022

Related U.S. Application Data

(63) Continuation of application No. PCT/CA2020/050832, filed on Jun. 16, 2020.
(Continued)

(51) Int. Cl.
*A01G 20/12* (2018.01)
*A01G 20/15* (2018.01)
(Continued)

(52) U.S. Cl.
CPC ............. *A01G 20/12* (2018.02); *A01G 20/15* (2018.02); *G05D 5/04* (2013.01); *A01D 57/20* (2013.01)

(58) Field of Classification Search
CPC .......... A01G 20/12; A01G 20/15; G05D 5/04; A01D 57/20
See application file for complete search history.

(56) References Cited

U.S. PATENT DOCUMENTS

| 2,614,477 | A | * | 10/1952 | Habenicht | ............... | A01G 20/12 |
| | | | | | | 172/170 |
| 3,429,377 | A | * | 2/1969 | Nunes, Jr. | ............... | A01G 20/12 |
| | | | | | | 172/19 |

(Continued)

FOREIGN PATENT DOCUMENTS

| CA | 2375892 A1 | * | 1/2001 | ............. | A01B 45/04 |
| CN | 108157070 A | * | 6/2018 | ............. | A01G 20/12 |

(Continued)

OTHER PUBLICATIONS

Alison Canteenwalla., "Written Opinion of the International Searching Authority" and "PCT International Search Report", PCT Application No. PCT/CA2020/050832, Aug. 24, 2020, Canadian Intellectual Property Office, Gatineau, Quebec, 7 pages.

(Continued)

*Primary Examiner* — Arpad Fabian-Kovacs

(57) ABSTRACT

A harvesting system for harvesting sod includes: (a) a harvester frame; (b) a cutting assembly mounted to the harvester frame for cutting the sod into slabs, each slab having a cut-off length; (c) a conveyor assembly supported by the harvester frame for transporting the slabs away from the cutting assembly toward a measuring location; and (d) a control system operable to: (i) determine a length difference between a measured length for at least one slab at the measuring location and a target length, and (ii) adjust the cut-off length for subsequent slabs to compensate for the length difference.

20 Claims, 2 Drawing Sheets

Related U.S. Application Data

(60) Provisional application No. 62/862,283, filed on Jun. 17, 2019.

(51) Int. Cl.
 *G05D 5/04* (2006.01)
 *A01D 57/20* (2006.01)

(56) References Cited

U.S. PATENT DOCUMENTS

| | | | | |
|---|---|---|---|---|
| 3,509,944 | A * | 5/1970 | Brouwer | A01G 20/15 172/101 |
| 3,590,927 | A * | 7/1971 | Brouwer | A01G 20/15 37/375 |
| 3,807,505 | A * | 4/1974 | Nunes | A01G 20/15 172/20 |
| 3,913,682 | A * | 10/1975 | Kaercher, Jr. | A01G 20/12 172/101 |
| 4,966,239 | A * | 10/1990 | Hutchison | A01G 20/15 180/401 |
| 5,626,195 | A * | 5/1997 | Dover | A01G 20/15 414/789.7 |
| 6,244,354 | B1 * | 6/2001 | Van Vuuren | A01G 20/15 172/19 |
| 6,273,196 | B1 * | 8/2001 | Van Vuuren | A01G 20/15 172/20 |
| 7,264,063 | B1 * | 9/2007 | Dover | A01G 20/12 172/20 |
| 7,740,083 | B2 † | 6/2010 | Tvetene | |
| 8,176,991 | B1 * | 5/2012 | Kornecki | A01B 49/027 172/175 |
| 9,629,296 | B2 † | 4/2017 | Aposhian | |
| 11,357,177 | B2 † | 6/2022 | Aposhian | |
| 2005/0167123 | A1 * | 8/2005 | Pohlman | A01G 20/15 172/20 |
| 2006/0102363 | A1 † | 5/2006 | Tvetene | |
| 2014/0238709 | A1 * | 8/2014 | Brouwer | A01G 20/15 172/20 |
| 2017/0027098 | A1 | 2/2017 | Aposhian et al. | |
| 2017/0027099 | A1 | 2/2017 | Aposhian et al. | |
| 2017/0027100 | A1 | 2/2017 | Aposhian et al. | |
| 2020/0305358 | A1 † | 10/2020 | Aposhian | |
| 2022/0110272 | A1 † | 4/2022 | Aposhian | |

FOREIGN PATENT DOCUMENTS

| | | | | |
|---|---|---|---|---|
| GB | 2561420 | A | | 10/2018 |
| KR | 20220083790 | A * | 6/2022 | B26D 5/00 |
| NL | 1012614 | C2 * | 1/2001 | A01G 20/15 |
| WO | 0105212 | A1 | 1/2001 | |
| WO | 2004006644 | A1 | 1/2004 | |
| WO | 2020252569 | A1 | 12/2020 | |

OTHER PUBLICATIONS

Perkon, Dave, Automation in Agriculture—How FireFly's Turf Harvesting Machine Ups Productivity, Apr. 6, 2016, Control Design, online, last accessed on Sep. 18, 2023, https://www.controldesign.com/control/embedded-control/article/11322938/automation-in-agriculturehow-fireflys-turf-harvesting-machine-ups-productivity.†

\* cited by examiner
† cited by third party

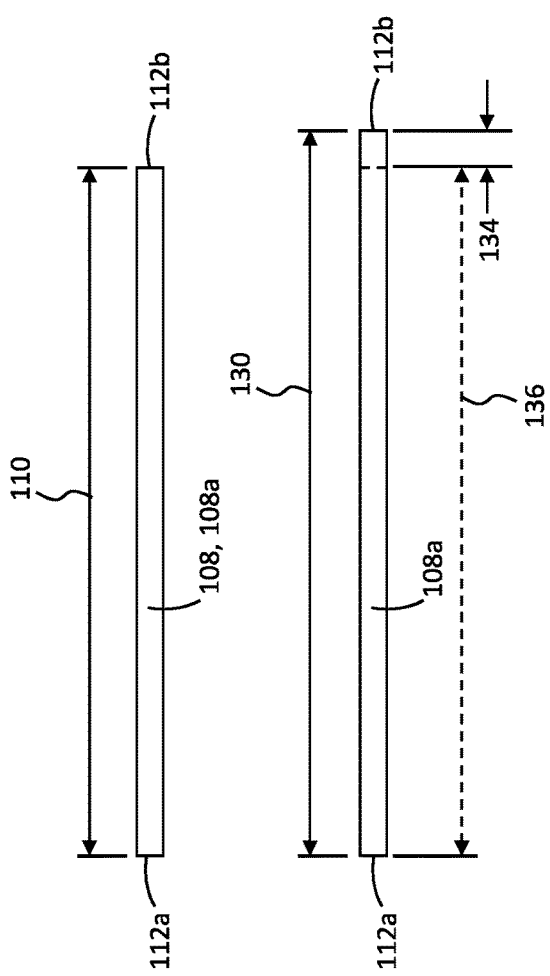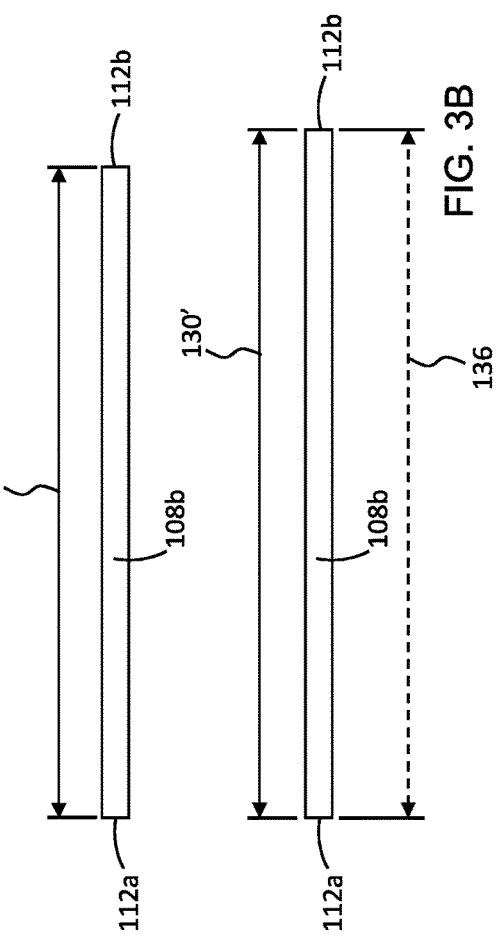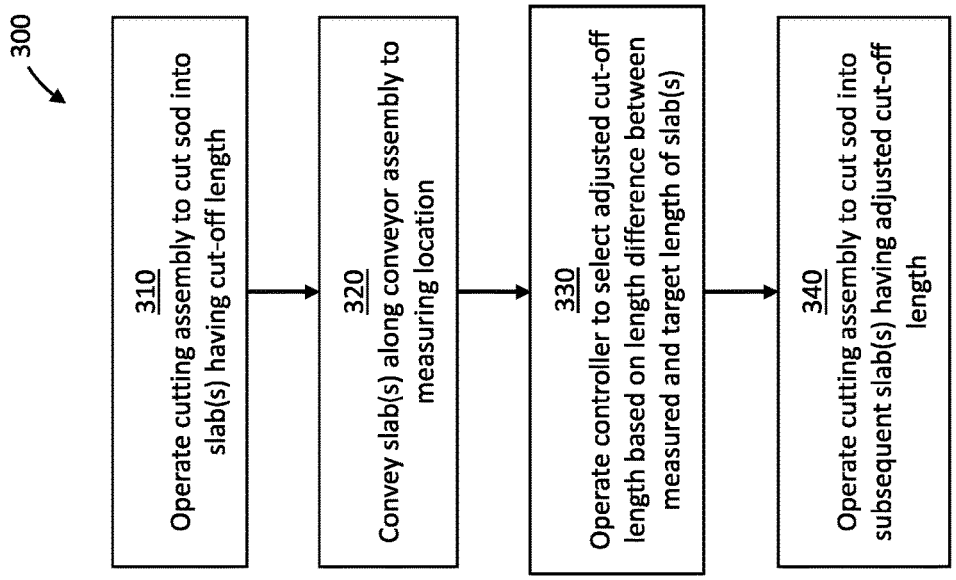

SOD HARVESTING SYSTEMS WITH SLAB LENGTH ADJUSTABILITY

CROSS-REFERENCE TO RELATED APPLICATIONS

This application is a continuation of International Application No. PCT/CA2020/050832, filed Jun. 16, 2020, which claims the benefit of U.S. Provisional Application No. 62/862,283, filed on Jun. 17, 2019, each of which is hereby incorporated herein by reference in its entirety.

FIELD

The specification relates generally to sod harvesting, and more specifically, to sod harvesting systems with automatically adjustable cutting assemblies and related methods.

BACKGROUND

Sod harvesters typically operate by undercutting and chopping sod into slabs, transporting the slabs along a conveyor of the harvester, optionally rolling the slabs into rolls, and transferring the slabs or rolls onto a pallet. The pallet, containing a stack of the slabs or rolls, can then be transported to a location where the sod is to be sold or laid.

SUMMARY

The following summary is intended to introduce the reader to various aspects of the applicant's teaching, but not to define any invention.

According to some aspects, a system for harvesting sod includes: (a) a harvester frame; (b) a cutting assembly mounted to harvester frame for cutting the sod into slabs, each slab having a cut-off length between a leading edge and a trailing edge of the slab; (c) a conveyor assembly supported by the harvester frame for transporting the slabs away from the cutting assembly toward a measuring location; (d) at least one slab sensor operable to detect one or more slab properties at the measuring location for determining a measured length between the leading edge and the trailing edge of respective slabs, and (e) at least one controller for controlling operation of the cutting assembly. The controller is operable to: (i) determine the measured length of at least one slab based on the slab properties detected by the at least one slab sensor, (ii) determine a length difference between the measured length of the at least one slab and a target length, and (iii) adjust the cut-off length for subsequent slabs to compensate for the length difference.

In some examples, prior to adjustment, the cut-off length comprises the target length.

In some examples, the at least one slab comprises a plurality of slabs, and the length difference corresponds to an average length difference for the plurality of slabs.

In some examples, the at least one controller is operable to determine if the length difference satisfies an adjustment threshold indicating an adjustment to the cut-off length is required, and to adjust the cut-off length if the length difference satisfies the adjustment threshold.

In some examples, the at least one controller is operable to adjust the cut-off length by an adjustment value determined based on the length difference. In some examples, the at least one controller is operable to decrease the cut-off length by the adjustment value if the measured length is greater than the target length, and to increase the cut-off length by the adjustment value if the measured length is less than the target length. In some examples, the controller is operable to determine the adjustment value based further on one or more operating conditions of the system.

In some examples, the cutting assembly includes a cut-off mechanism for cross-cutting the sod to the cut-off length, and the at least one controller is operable to actuate the cut-off mechanism each time the cutting assembly travels a ground distance interval corresponding to the cut-off length, and to adjust the cut-off length by modifying the ground distance interval.

According to some aspects, a harvesting system for harvesting sod includes: (a) a harvester frame; (b) a cutting assembly mounted to the harvester frame for cutting the sod into slabs, each slab having a cut-off length; (c) a conveyor assembly supported by the harvester frame for transporting the slabs away from the cutting assembly toward a measuring location; and (d) a control system operable to: (i) determine a length difference between a measured length for at least one slab at the measuring location and a target length, and (ii) adjust the cut-off length for subsequent slabs to compensate for the length difference.

According to some aspects, a method of operating a cutting assembly of a sod harvesting system includes: (a) operating the cutting assembly to cut sod into at least one slab having a cut-off length; (b) transporting the at least one slab along a conveyor assembly away from the cutting assembly toward a measuring location; (c) operating a control system to: (i) determine a measured length of the at least one slab based on one or more slab properties detected at the measuring location, (ii) determine a length difference for the at least one slab between the measured length and a target length, and (iii) select an adjusted cut-off length for subsequent slabs to compensate for the length difference; and (d) operating the cutting assembly to cut sod into at least one subsequent slab having the adjusted cut-off length.

In some examples, prior to adjustment, the cut-off length comprises the target length.

In some examples, the at least one slab comprises a plurality of slabs, and the length difference determined in step (c) corresponds to an average length difference for the plurality of slabs.

In some examples, the control system selects the adjusted cut-off length by: determining an adjustment value based on the length difference and adjusting the cut-off length by the adjustment value. In some examples, the adjustment value is determined based further on one or more operating conditions of the harvesting system.

In some examples, step (c) includes operating the control system to: determine if the length difference satisfies an adjustment threshold indicating an adjustment to the cut-off length is required.

In some examples, step (a) includes actuating a cut-off mechanism of the cutting assembly each time the cutting assembly travels a ground distance interval corresponding to the cut-off length, and step (c) includes operating the control system to modify the ground distance interval to correspond to the adjusted cut-off length.

In some examples, step (b) includes straining the at least one slab during transport to the measuring location.

According to some aspects, a system for harvesting sod includes: (a) a harvester frame; (b) a cutting assembly mounted to the harvester frame for cutting the sod into slabs, each slab having a cut-off length between a leading edge and a trailing edge of the slab; (c) a conveyor assembly supported by the harvester frame for transporting the slabs away from the cutting assembly toward a measuring location; (d) at least one slab sensor operable to detect one or more slab properties at the measuring location for determining a measured length between the leading edge and the trailing edge of respective slabs, and (e) at least one controller for controlling operation of the cutting assembly according to one or more operational parameters. The controller is operable to modify the operational parameters to adjust the cut-off length for subsequent slabs based at least in part on a difference between the measured length of previously cut slabs and a target length for the subsequent slabs.

According to some aspects, a system for harvesting sod includes: (a) a harvester frame; (b) a cutting assembly mounted to the harvester frame for cutting the sod into slabs, each slab defined by a plurality of cut dimensions when cut, the cut dimensions including a cut-off length, a width, and a thickness; (c) a conveyor assembly supported by the harvester frame for transporting the slabs away from the cutting assembly toward a measuring location; (d) at least one slab sensor operable to detect one or more slab properties at the measuring location for measuring one or more measured dimensions of respective slabs, the one or more measured dimensions corresponding to one or more of the cut dimensions, and (e) at least one controller for controlling operation of the cutting assembly according to one or more operational parameters. The controller is operable to: (i) determine the one or more measured dimensions of at least one slab based on the slab properties detected by the at least one slab sensor; (ii) determine a difference between the one or more measured dimensions of the at least one slab and corresponding target dimensions for subsequent slabs, and (iii) modify the operational parameters to adjust one or more of the cut dimensions for the subsequent slabs to compensate for the difference between the one or more measured dimensions and the corresponding target dimensions.

BRIEF DESCRIPTION OF THE DRAWINGS

The drawings included herewith are for illustrating various examples of systems, methods, apparatuses, and articles of the present specification and are not intended to limit the scope of what is taught in any way. In the drawings:

FIG. 3A is a schematic view showing a cut-off length and a measured length for a first sod slab relative to a target length;

FIG. 3B is a schematic view showing an adjusted cut-off length and an adjusted measured length for a second sod slab relative to the target length; and FIG. 4 is a flow chart showing an example method of operating a harvesting system similar to that of FIG. 1.

DETAILED DESCRIPTION

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim, or dedicate to the public any such invention by its disclosure in this document.

During sod harvesting, sod is cut from the ground using a cutting assembly of a sod harvester to form slabs initially having a cut-off length, and the slabs are transported along a conveyor of the sod harvester. During transport onto and/or along the conveyor, the slabs may be strained (e.g. stretched or compressed). This may result in the final or intermediate length of the slabs deviating from the cut-off length and/or from a desired target length for the slabs. The present specification discloses aspects of sod harvesting systems and methods that may facilitate automatic adjustment of cutting assembly operation, and in particular of the cut-off length, to help compensate for such deviation in slab length. The teachings of the present specification can also be applicable with respect to measurement and/or adjustment of other dimensions of the slabs, including, for example, width and/or thickness of the slabs.

Figure 1:
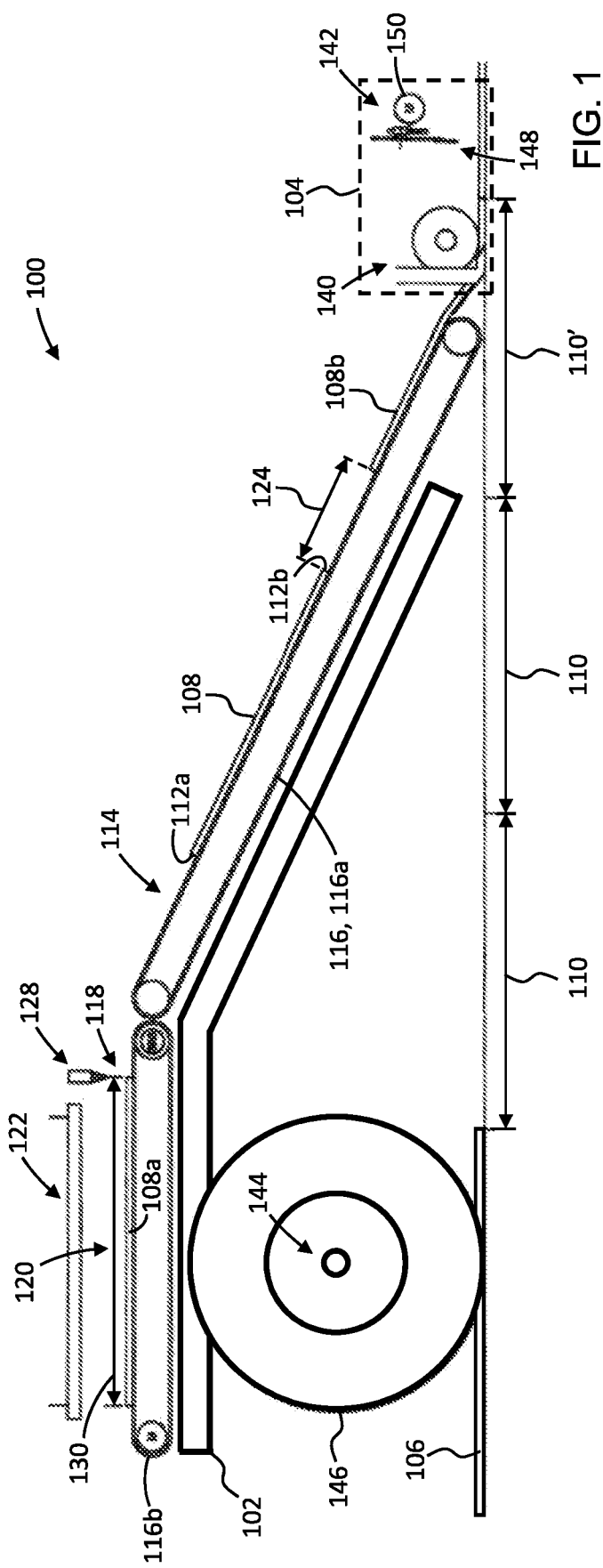
FIG. 1 is a schematic elevation view of an example harvesting system for harvesting sod.

Referring to FIG. 1, an example sod harvesting system 100 for harvesting sod is illustrated schematically. The harvesting system 100 includes a harvester frame 102 and a cutting assembly 104 mounted to the harvester frame 102 for cutting sod 106 into slabs 108. In the example illustrated, the cutting assembly 104 operates to cross-cut the sod 106 at selected intervals to provide each slab 108 with a cut-off length 110 between a leading edge 112a and a trailing edge 112b of the slab 108 (see also FIG. 3A).

The harvesting system 100 further includes a conveyor assembly 114 including one or more conveyors 116 supported by the harvester frame 102. In the example illustrated, the conveyor assembly 114 is operable to receive slabs 108 from the cutting assembly 104, and to transport the slabs 108 away from the cutting assembly 104 toward a measuring location 118 downstream of the cutting assembly 104. In the example illustrated, the conveyor assembly 114 is operable to transport slabs 108 from the cutting assembly 104 to a handling location 120 for handling of the slabs 108, and the measuring location 118 is intermediate the cutting assembly 104 and the handling location 120. In the example illustrated, the measuring location 118 is upstream of and adjacent to the handling location 120, and each slab 108 passes the measuring location 118 during transport along the conveyor assembly 114 to the handling location 120.

In the example illustrated, the harvesting system 100 can include a handling apparatus 122 proximate the handling location 120 for handling and/or manipulating slabs 108 at the handling location 120. In the example illustrated, the handling apparatus 122 comprises a pick-up head above the handling location 120 for transferring slabs 108 from the handling location 120 to a pallet. In some examples, the handling apparatus may include a rolling mechanism (not shown) for rolling slabs into rolls, and a pick-up head for transferring rolls from the conveyor assembly 114 to a pallet.

In the example illustrated, the measuring location 118 and the handling location 120 are located along the conveyor assembly 114. In the example illustrated, the conveyor assembly 114 includes at least one first conveyor 116a and at least one second conveyor 116b downstream of the first conveyor 116a. In the example illustrated, the first conveyor 116a is inclined, and the second conveyor 116b is generally horizontal. The first conveyor 116a is operable to receive slabs 108 from the cutting assembly 104, and to transport the slabs 108 to the second conveyor 116b. In the example illustrated, the measuring location 118 and the handling location 120 are located along the second conveyor 116*b*. In other examples, the measuring location 118 may be located along, for example, the first conveyor 116*a*, and in some examples, the measuring location 118 may be adjacent the cutting assembly 104.

In the example illustrated, during harvesting, the first conveyor 116*a* is operable at a first conveyor speed that is greater than a ground speed at which the cutting assembly 104 travels to provide a slab spacing 124 between adjacent slabs 108 received from the cutting assembly 104. The second conveyor 116*b* may be operated at a second conveyor speed. The second conveyor speed may match the first conveyor speed when the second conveyor 116*b* is receiving a slab 108 from the first conveyor 116*a*, which may help reduce slippage and strain on the slab 108. The second conveyor speed may otherwise be reduced relative to the first conveyor speed to facilitate handling and/or measurement of slabs 108 on the second conveyor 116*b*. In some examples, the at least one first conveyor 116*a* may include a plurality of first conveyors 116*a* arranged in series to transport slabs 108 from the cutting assembly 104 to the second conveyor 116*b*. In some examples, the at least one second conveyor 116*b* may include a plurality of second conveyors 116*b* arranged in series to transport slabs 108 from the at least one first conveyor 116*a* to the handling location 120.

In the example illustrated, the harvesting system 100 includes a control system 126 (FIG. 2) for controlling operation of the harvesting system 100. The control system 126 includes at least one slab sensor 128 operable to detect one or more slab properties at the measuring location 118 for determining a measured length 130 between the leading edge 112*a* and the trailing edge 112*b* of respective slabs 108. The measured length 130 may be different from the cut-off length 110 due to, for example, the slabs 108 being strained (e.g. stretched or compressed) during transport along the conveyor assembly 114 to the measuring location 118. The slabs 108 may be strained due to, for example, transport of the slabs 108 from the ground to a conveyor 116 operating at a conveyor speed different from the ground speed, or between upstream and downstream conveyors 116 operating at different conveyor speeds.

In the example illustrated, the at least one slab sensor 128 is proximate the measuring location 118, and may be positioned above, below, and/or to a side of slabs 108 at the measuring location 118. The at least one slab sensor 128 can comprise one or more mechanical and/or electronic sensors for detecting the one or more slab properties. The slab properties may comprise, for example, the presence of slabs, a speed of slabs, a leading edge and a trailing edge of slabs, a distance between the leading edge and the trailing edge of slabs, and/or any other properties that may facilitate determination of the measured length 130 (and in some examples, one or more other slab dimensions such as slab width and/or thickness). The at least one slab sensor 128 can comprise, for example, a length sensor, a photoelectric sensor, a light diffuse sensor, a proximity sensor, a measuring wheel encoder, an image sensor, and/or any other sensor(s) suitable for individually or in combination detecting the one or more slab properties.

In the example illustrated, the control system 126 includes at least one controller 132 (FIG. 2) for controlling operation of the cutting assembly 104 to facilitate automatic adjustment of the cut-off length. In the example illustrated, the controller 132 is operable to (i) determine the measured length 130 of at least one slab 108*a* based on the one or more slab properties detected by the slab sensor 128, (ii) determine a length difference 134 (FIG. 3A) between the measured length 130 of the at least one slab 108*a* and a target length 136, and (iii) adjust the cut-off length 110 for subsequent slabs 108*b* to compensate for the length difference 134. This may facilitate, for example, automatic adjustment of cutting assembly operation to account for straining of the slab 108*a* during transport to the measuring location 118, so that subsequent slabs 108*b* are cut to an adjusted cut-off length 110' (shown in FIG. 3B) that may provide a reduced length difference 134 relative to that of the previously cut slab(s) 108*a*.

In some examples, the controller 132 can be operable to determine the measured length 130 of a slab 108 based on, for example, a detection time corresponding to how long it takes for the slab 108 to travel through a detection point at the measuring location 118, and a transport rate at which the slab 108 was transported through the detection point. The detection time can be determined based on, for example, detection by the slab sensor 128 of the leading edge 112*a* and the trailing edge 112*b* passing the detection point. The transport rate can be determined based on, for example, a conveyor speed of the conveyor transporting the slabs through the detection point (e.g. the second conveyor speed of the second conveyor 116*b* during transport of the slab 108*a* through the detection point). In some examples, the at least one controller 132 can be operable to control the conveyor speed of the conveyors 116 (e.g. by controlling operation of conveyor motors).

In other examples, the slab sensor 128 may comprise, for example, a wheel encoder operable to measure angular displacement of a slab measuring wheel. The slab measuring wheel can be positioned proximate the measuring location 118 for rotation when engaged by a slab passing under (or over) the slab measuring wheel. In such examples, the controller 132 can be operable to determine the measured length 130 based on the angular displacement detected by the wheel encoder.

Referring to FIGS. 3A and 3B, in the example illustrated, the target length 136 may be predetermined to correspond to, for example, a desired length for slabs at the measuring location 118 (e.g. 18 inches, 24 inches, 36 inches, 48 inches, etc.). In the example illustrated, prior to an initial adjustment, the cut-off length 110 can comprise the target length 136, and can be subsequently adjusted to compensate for a determined length difference 134. In some examples, the controller 132 can be operable to determine if the length difference 134 satisfies an adjustment threshold indicating an adjustment to the cut-off length 110 is required, and to adjust the cut-off length 110 if the length difference 134 satisfies the adjustment threshold. The adjustment threshold can correspond to, for example, a predetermined deviation of the measured length 130 from the target length 136. For example, the target length 136 may be set to 24 inches and the adjustment threshold may correspond to a deviation of at least ½ inch (or about 2%) from the target length 136, in which case the controller 132 can be operable to adjust the cut-off length 110 if the length difference 134 is at least ½ inch (or about 2%), and to not adjust the cut-off length 110 if the length difference 134 is less than ½ inch (or about 2%).

In some examples, the length difference 134 determined by the controller 132 may correspond to an average length difference for a plurality of slabs 108. For example, the controller 132 can be operable to determine the measured length 130 for a plurality of slabs 108, determine the length difference 134 based on the average length difference for the plurality of slabs 108, and adjust the cut-off length 110 to compensate for the average length difference. This may help to, for example, smooth adjustment of the cut-off length 110 during an initial calibration period and/or during normal operation. In some examples, the average length difference may be determined on a moving average basis (e.g. based on the average length difference for a predetermined number of the most recently cut and measured slabs 108). In some examples, the controller 132 may be operable to adjust the cut-off length 110 based on the average length difference during an initial calibration period, and to iteratively adjust the cut-off length 110 based on the length difference 134 for individual slabs during normal operation.

In some examples, the controller 132 can be operable to adjust the cut-off length 110 by an adjustment value determined based on the length difference 134. In some examples, the controller 132 can be operable to decrease the cut-off length 110 by the adjustment value if the measured length 130 is greater than the target length 136, and to increase the cut-off length 110 by the adjustment value if the measured length 130 is less than the target length 136.

In some examples, the controller 132 can be operable to determine the adjustment value based further on operating conditions of the harvesting system 100, such as, for example, a conveyor speed and/or acceleration, and/or a ground speed and/or acceleration. This may be helpful in accounting for changes in harvester operating conditions that may affect the amount of strain that will be experienced by subsequent slabs relative to previously cut and measured slabs.

Referring to FIG. 1, in the example illustrated, the cutting assembly 104 includes a cutting head 140 for stripping sod 106 from the ground, and a cut-off mechanism 142 for cross-cutting the sod 106 to the cut-off length 110 when actuated. In the example illustrated, the controller 132 is operable to actuate the cut-off mechanism 142 each time the cutting assembly 104 travels a ground distance interval corresponding to the cut-off length 110, and to adjust the cut-off length 110 by modifying the ground distance interval. The controller 132 can be operable to determine when the cutting assembly 104 has travelled the ground distance interval based on one or more travel properties detected by a travel sensor 144. In the example illustrated, the travel sensor 144 comprises a ground wheel encoder operable to measure angular displacement of a ground wheel 146 during operation of the harvesting system 100, and the controller 132 can be operable to determine when the cutting assembly 104 has travelled the ground distance interval based on the angular displacement measured by the ground wheel encoder.

In the example illustrated, the cut-off mechanism 142 includes a cut-off frame and a blade assembly 148 movably supported by the cut-off frame. The blade assembly 148 is movable from a raised position (shown in FIG. 1) in which the blade assembly is clear of the ground, toward a lowered position for driving at least one blade of the blade assembly 148 into the ground to cross-cut the sod. In the example illustrated, the cut-off mechanism 142 further includes a cut-off motor 150 operable by the controller 132 to actuate the cut-off mechanism 142 for driving the blade assembly 148 downwardly toward the lowered position. In some examples, the cut-off mechanism 142 can further include a spring urging the blade assembly 148 toward the lowered position, and a cam rotatable between a hold position in which the blade assembly 148 is held in the raised position and a cut position in which the cam is clear of the blade assembly for permitting the spring to drive the blade assembly 148 downwardly toward the lowered position. In such examples, the cut-off motor 150 can be operable by the controller 132 to drive rotation of the cam from the hold position to the cut position for actuating the cut-off mechanism 142. The motor 150 may comprise a hydraulic and/or electric motor.

Figure 2:
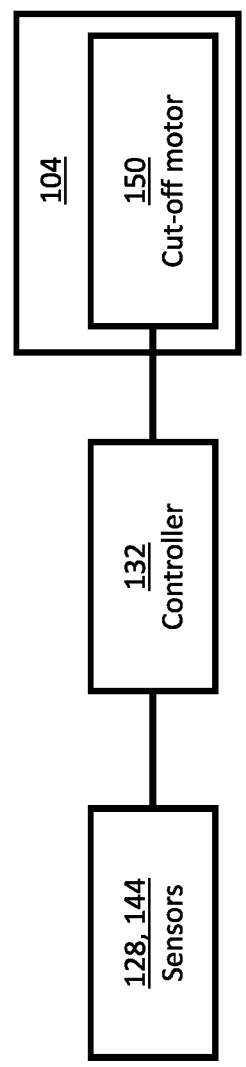
FIG. 2 is a schematic of an example control system of the harvesting system of FIG. 1.

Referring to FIG. 4, an example process 300 for operating a harvesting system similar to the system 100 is shown, and will be described with respect to the harvesting system 100 of FIGS. 1 and 2. At step 310 of the process 300, the cutting assembly 104 is operated to cut the sod 106 into at least one slab 108a having cut-off length 110 (see also FIG. 3A). In the example illustrated, step 310 can include actuating the cut-off mechanism 142 each time the cutting assembly 104 travels a predetermined ground distance interval corresponding to the cut-off length 110.

At step 320, the slab 108a is transported away from the cutting assembly 104 along the conveyor assembly 114 toward the measuring location 118. In the example illustrated, the slab 108a may be strained during transport along the conveyor assembly 114 to the measuring location 118. As discussed above, the strain during transport may cause the slab 108a to, for example, stretch.

At step 330, the control system 126 is operated to: (i) determine the measured length 130 of the slab 108a based on one or more slab properties detected at the measuring location 118, (ii) determine the length difference 134 for the slab 108a between the measured length 130 and the target length 136, and (iii) select an adjusted cut-off length 110' (see also FIG. 3B) for subsequent slabs 108b to compensate for the length difference 134. Step 330 can include operating the control system 126 to modify the ground distance interval (for actuating the cut-off mechanism 142) to correspond to the adjusted cut-off length 110'.

At step 340, the cutting assembly 104 is operated to cut the sod 106 into at least one subsequent slab 108b having the adjusted cut-off length 110' (see also FIG. 3B), to reduce the length difference for the subsequent slab 108b (i.e. to provide the slab 108b with an adjusted measured length 130' that is closer to the target length 136 than the measured length 130 of the slab 108a).

The control system and/or controller of the harvesting system 100 can include, for example, one or more processors (e.g. central processing units, digital signal processors, etc.), Field Programmable Gate Arrays (FPGA), application specific integrated circuits (ASIC), and/or other types of control units capable of independently or in combination carrying out the functionality and methods of the present specification. In some examples, the at least one controller 132 can include a plurality of processors, and each processor may be configured to perform dedicated tasks for controlling the harvesting system 100. For example, in some examples, the controller 132 can include one or more sensor processors integrated with the slab sensor 128 and/or travel sensor 144 for processing sensor signals received therefrom, and one or more cutting assembly processors for controlling operation of the cutting assembly and adjustment of the cut-off length based on sensor data received from the sensor processors. In some examples, the control system 126 can include computer readable memory for storing computer readable instructions (e.g. defining the target length, ground distance interval, conveyor speeds, etc.) retrievable, and in some examples adjustable, by the controller 132 or other system components for operation thereof according to the present teachings.

The invention claimed is:

1. A system for harvesting sod, the system comprising:
   a) a harvester frame;
   b) a cutting assembly mounted to the harvester frame for cutting the sod into slabs, each slab having a cut-off length between a leading edge and a trailing edge of the slab;
   c) a conveyor assembly supported by the harvester frame and configured to transport the slabs away from the cutting assembly toward a measuring location;
   d) at least one slab sensor configured to detect one or more slab properties at the measuring location for determining a measured length between the leading edge and the trailing edge of respective slabs, and
   e) at least one controller for controlling operation of the cutting assembly, the controller configured to:
      i) determine the measured length of at least one slab based on the slab properties detected by the at least one slab sensor,
      ii) determine a length difference between the measured length of the at least one slab and a target length, and
      iii) adjust the cut-off length for subsequent slabs to compensate for the length difference.

2. The system of claim 1, wherein prior to adjustment, the cut-off length comprises the target length.

3. The system of claim 1, wherein the at least one slab comprises a plurality of slabs, and the length difference corresponds to an average length difference for the plurality of slabs.

4. The system of claim 1, wherein the at least one controller is configured to determine if the length difference satisfies an adjustment threshold indicating an adjustment to the cut-off length is required, and to adjust the cut-off length if the length difference satisfies the adjustment threshold.

5. The system of claim 1, wherein the at least one controller is configured to adjust the cut-off length by an adjustment value determined based on the length difference.

6. The system of claim 5, wherein the at least one controller is operable configured to decrease the cut-off length by the adjustment value if the measured length is greater than the target length and to increase the cut-off length by the adjustment value if the measured length is less than the target length.

7. The system of claim 5, wherein the controller is configured to determine the adjustment value based further on one or more operating conditions of the system.

8. The system of claim 1, wherein the cutting assembly includes a cut-off mechanism for cross-cutting the sod to the cut-off length, and the at least one controller is configured to actuate the cut-off mechanism each time the cutting assembly travels a ground distance interval corresponding to the cut-off length, and to adjust the cut-off length by modifying the ground distance interval.

9. The system of claim 1, wherein the conveyor assembly includes at least one first conveyor for receiving the slabs from the cutting assembly and at least one second conveyor downstream from the at least one first conveyor, and wherein the measuring location is located along the at least one second conveyor.

10. The system of claim 9, wherein the conveyor assembly is configured to transport the slabs toward a handling location along the at least one second conveyor and adjacent the measuring location, and the system includes a pick-up head positionable overtop of the handling location.

11. A harvesting system for harvesting sod, the harvesting system comprising:
   a) a harvester frame;
   b) a cutting assembly mounted to the harvester frame for cutting sod into slabs, each slab having a cut-off length;
   c) a conveyor assembly supported by the harvester frame for transporting the slabs away from the cutting assembly toward a measuring location; and
   d) a control system configured to: (i) determine a length difference between a measured length for at least one slab at the measuring location and a target length, and (ii) adjust the cut-off length for subsequent slabs to compensate for the length difference.

12. A method of operating a cutting assembly of a sod harvesting system, comprising:
   a) operating the cutting assembly to cut sod into at least one slab having a cut-off length;
   b) transporting the at least one slab along a conveyor assembly away from the cutting assembly toward a measuring location;
   c) operating a control system to: (i) determine a measured length of the at least one slab based on one or more slab properties detected at the measuring location, (ii) determine a length difference for the at least one slab between the measured length and a target length, and (iii) select an adjusted cut-off length for subsequent slabs to compensate for the length difference; and
   d) operating the cutting assembly to cut sod into at least one subsequent slab having the adjusted cut-off length.

13. The method of claim 12, wherein prior to adjustment, the cut-off length comprises the target length.

14. The method of claim 12, wherein the at least one slab comprises a plurality of slabs, and the length difference determined in step (c) corresponds to an average length difference for the plurality of slabs.

15. The method of claim 14, wherein the control system selects the adjusted cut-off length by: determining an adjustment value based on the length difference and adjusting the cut-off length by the adjustment value.

16. The method of claim 15, wherein the adjustment value is determined based further on one or more operating conditions of the sod harvesting system.

17. The method of claim 12, wherein step (c) includes operating the control system to: determine if the length difference satisfies an adjustment threshold indicating an adjustment to the cut-off length is required.

18. The method of claim 12, wherein step (a) includes actuating a cut-off mechanism of the cutting assembly each time the cutting assembly travels a ground distance interval corresponding to the cut-off length, and step (c) includes operating the control system to modify the ground distance interval to correspond to the adjusted cut-off length.

19. A system for harvesting sod, the system comprising:
   a) a harvester frame;
   b) a cutting assembly mounted to the harvester frame for cutting the sod into slabs, each slab having a cut-off length between a leading edge and a trailing edge of the slab;
   c) a conveyor assembly supported by the harvester frame for transporting the slabs away from the cutting assembly toward a measuring location;
   d) at least one slab sensor configured to detect one or more slab properties at the measuring location for determining a measured length between the leading edge and the trailing edge of respective slabs, and
   e) at least one controller for controlling operation of the cutting assembly according to one or more operational parameters, the controller configured to modify the operational parameters to adjust the cut-off length for subsequent slabs based at least in part on a difference between the measured length of previously cut slabs and a target length for the subsequent slabs.

20. A system for harvesting sod, the system comprising:
a) a harvester frame;
b) a cutting assembly mounted to the harvester frame for cutting the sod into slabs, each slab defined by a plurality of cut dimensions when cut, the cut dimensions including a cut-off length, a width, and a thickness;
c) a conveyor assembly supported by the harvester frame for transporting the slabs away from the cutting assembly toward a measuring location;
d) at least one slab sensor configured to detect one or more slab properties at the measuring location for measuring one or more measured dimensions of respective slabs, the one or more measured dimensions corresponding to one or more of the cut dimensions, and
e) at least one controller for controlling operation of the cutting assembly according to one or more operational parameters, the controller configured to:
 i) determine the one or more measured dimensions of at least one slab based on the slab properties detected by the at least one slab sensor,
 ii) determine a difference between the one or more measured dimensions of the at least one slab and corresponding target dimensions for subsequent slabs, and
 iii) modify the operational parameters to adjust one or more of the cut dimensions for the subsequent slabs to compensate for the difference between the one or more measured dimensions and the corresponding target dimensions for the subsequent slabs.

* * * * *